UNITED STATES PATENT OFFICE.

PATRICK F. SOLAN AND HERBERT STANTON BALLIET, OF NEW YORK, N. Y.

NON-SLIPPING PAVING COMPOSITION.

15,097. Specification of Reissued Letters Patent. Reissued Apr. 26, 1921.

No Drawing. Original No. 1,193,938, dated August 8, 1916, Serial No. 14,759, filed March 16, 1915. Application for reissue filed August 26, 1918. Serial No. 251,577.

*To all whom it may concern:*

Be it known that we, PATRICK F. SOLAN and HERBERT S. BALLIET, citizens of the United States of America, residing at Manhattan, in the city, county, and State of New York, have invented certain new and useful Improvements in Non-Slipping Paving Composition, of which the following is a specification.

Our invention consists in a new composition of matter, particularly well adapted for use as a surface for ramps, stair treads, side walks and other places where a slippery surface would be objectionable.

Tile or stone or metal surfaces, where there is much travel, are likely to become so smooth as to render walking more difficult than is desirable, because there is too little friction between them and the soles of the foot coverings of the pedestrians passing over them. As they become more slippery, they are liable to cause falls or other accidents. Concrete and some other substances absorb the dirt carried to them by the feet of the multitude and speedily become as objectionable as those previously named. A suitable tread should not be so hard as to wear smooth enough to lose its non-slipping characteristics nor so soft as to wear away too quickly, since that result would make it unduly expensive, because of required renewals, and otherwise objectionable because travel is not even and too soft a surface is soon worn into irregular forms which are also sources of danger as well as unsightly.

To meet the requirements for a reasonably durable material which shall continuously present a sufficiently rough surface to prevent the slipping produced by too smooth a material and shall yet be capable of wearing sufficiently even to preserve it from becoming objectionably irregular, we have devised a composition of matter which possesses to an unusual degree the characteristics desired. The body of this surfacing material might be termed a variety of concrete since it is composed largely of cement; but the body is used to carry an abrasive of a character which chips apart or disintegrates as grains rather than as dust and therefore maintains the desirable surface roughness. The concrete to carry and maintain these particles of abrasive in proper position should be soft enough to wear away about as fast as the particles of abrasive are likely to break off, so that a substantially even surface may be maintained, and the closer this wearing and breaking coördinate, the better and more durable will be the surface of the tread.

In producing our composition we prefer to prepare a plastic mass composed of sand, grit or finely divided gravel or granite, cement, carborundum, and, if a color be desired, oxid of iron, in about the following proportions: 400 pounds of fine granite grit to 100 to 250 pounds of good sand, say Cow-Bay sand, preferably 250 pounds, 300 to 600 pounds of cement, preferably 400 pounds of Portland or Atlas, about 40 pounds of carborundum and 10½ pounds of ferric oxid, though we do not limit ourselves to the preferred proportions given, nor the exact materials. For instance, if a black mass, instead of a colored one, is desired, we would use lamp-black in place of oxid of iron. We might omit both, leaving the color to be determined by the other ingredients. Other grit than granite grit, such as fine gravel, if hard and sharp, and other sand than Cow-Bay sand might be used. We use those names because their qualities are well known and any manufacturer would understand the requirements and what would be equivalents (of which fine gravel would be one), when told that the qualities of these well known articles are the required ones. We prefer carborundum for the abrasive, but known substitutes including emery would answer, if not too fine, though its cost is generally prohibitive.

For the best results, the materials for each batch should be mixed dry, enough to insure that the various ingredients shall be thoroughly disseminated throughout the entire mass, and we have found that this requires a mixing at least five times, if the ordinary method of mixing,—by turning over with a mixing spade,—be adopted. With some forms of machine mixers, this number might be reduced, but a thorough mixing is essential to success in the mixing of a satisfactory composition. Having mixed the materials dry, we then add water and continue to work the mass as one would in making mortar. The quantity of water is not specifically limited, but the resultant composition should not be too thin or it would then flow off from its place of deposit before becoming set. About the consistency of good mortar is a safe rule and one which is readily understood. Having mixed the dry ingredients and the water thoroughly together, the mass is then disposed of according to the intended use.

If for a mass surface, for instance the surface of an inclined sidewalk, it is spread in place and smoothed off and pressed down with a trowel.

If for tiles or dimension pieces for setting in forms, it is poured or otherwise deposited into molds of the desired form and pressed down with a trowel. In either case, after about four hours, it should be rubbed over with a steel trowel, say about four times at intervals of an hour and a quarter and preferably kept wet, particularly if for tiles, for about twenty-four hours. If formed as tiles to be set and held together by a mortar base, a mortar of three parts sand to one of cement is best, setting the tiles from $\frac{1}{8}$ to $\frac{1}{2}$ of an inch apart, according to the desires of the particular architect in charge, and grouting the joints with a mortar composed of equal parts of Cow-Bay sand and cement.

What we claim and desire to secure by Letters-Patent, is:—

1. A new composition of matter composed of hard, sharp grit, sand, cement, an abrasive and a liquid, well mixed together in substantially the proportions set forth, and allowed to set.

2. A new composition of matter composed of hard, sharp grit, sand, cement, carborundum, and a liquid, well mixed together in substantially the proportions set forth, and allowed to set.

3. A new composition of matter composed of hard, sharp grit, sand, cement, an abrasive, and a liquid, together with a coloring matter, well mixed together in substantially the proportions set forth, and allowed to set.

4. A new composition of matter composed of hard, sharp grit, sand, cement, an abrasive, and ferric oxid, in about the proportions set forth, together with liquid to make a plastic mass, well mixed together and allowed to set.

PATRICK F. SOLAN.
HERBERT STANTON BALLIET.

Witnesses:
GEO. WM. MIATT,
DOROTHY MIATT.